United States Patent
Sakai et al.

(10) Patent No.: US 12,180,555 B2
(45) Date of Patent: Dec. 31, 2024

(54) BLAST FURNACE OPERATION METHOD

(71) Applicants: NIPPON STEEL CORPORATION, Tokyo (JP); JFE Steel Corporation, Tokyo (JP); Kobe Steel, Ltd., Kobe (JP); NIPPON STEEL ENGINEERING CO., LTD., Tokyo (JP)

(72) Inventors: Hiroshi Sakai, Tokyo (JP); Koki Nishioka, Tokyo (JP); Kaoru Nakano, Tokyo (JP)

(73) Assignees: NIPPON STEEL CORPORATION;, Tokyo (JP); JFE Steel Corporation, Tokyo (JP); Kobe Steel, Ltd., Kobe (JP); NIPPON STEEL ENGINEERING CO., LTD., Tokyo (JP)

( * ) Notice: Subject to any disclaimer, the term of this patent is extended or adjusted under 35 U.S.C. 154(b) by 645 days.

(21) Appl. No.: 17/430,657

(22) PCT Filed: Feb. 17, 2020

(86) PCT No.: PCT/JP2020/006011
§ 371 (c)(1),
(2) Date: Aug. 12, 2021

(87) PCT Pub. No.: WO2020/171008
PCT Pub. Date: Aug. 27, 2020

(65) Prior Publication Data
US 2022/0119899 A1 Apr. 21, 2022

(30) Foreign Application Priority Data
Feb. 18, 2019 (JP) ................. 2019-026220

(51) Int. Cl.
*C21B 5/00* (2006.01)
*F27B 14/14* (2006.01)

(52) U.S. Cl.
CPC .............. *C21B 5/006* (2013.01); *C21B 5/001* (2013.01); *F27B 14/143* (2013.01); *C21B 2005/005* (2013.01); *C21B 2300/04* (2013.01)

(58) Field of Classification Search
CPC .................... C21B 5/006; C21B 5/001; C21B 2005/005; C21B 2300/04; C21B 5/06; F27B 14/143
(Continued)

(56) References Cited

U.S. PATENT DOCUMENTS

| 2,719,083 | A | * | 9/1955 | Pomykala | ............... C21B 5/001 266/139 |
| 4,171,971 | A | | 10/1979 | Brotzmann et al. | |
| 5,234,490 | A | | 8/1993 | Kundrat | |

FOREIGN PATENT DOCUMENTS

| DE | 27 10 106 A1 | 9/1978 | |
| EP | 3395758 | * 10/2018 | ............... C21B 5/00 |

(Continued)

*Primary Examiner* — Jessee R Roe
*Assistant Examiner* — Michael Aboagye
(74) *Attorney, Agent, or Firm* — Birch, Stewart, Kolasch & Birch, LLP (57) ABSTRACT

A blast furnace operation method according to one aspect of the present invention includes: a process of acquiring a correlation between a carbon consumption in reducing gas and a reduction Input$\Delta C$ in specific carbon consumption caused by blowing the reducing gas into the blast furnace per molar ratio C/H of carbon atoms to hydrogen atoms in the reducing gas; a process of determining a carbon consumption in the reducing gas where the reduction Input$\Delta C$ in specific carbon consumption is a predetermined target value or higher on the basis of the correlation acquired per C/H; and a process of adjusting the amount of the reducing gas blown into the blast furnace on the basis of the determined (Continued)

carbon consumption in the reducing gas and the carbon proportion in the reducing gas.

13 Claims, 3 Drawing Sheets

(58) Field of Classification Search
USPC .................................................. 266/81, 197
See application file for complete search history.

(56) References Cited

FOREIGN PATENT DOCUMENTS

| | | | | |
|---|---|---|---|---|
| JP | 2006-207009 A | 8/2006 | | |
| JP | 2006-233332 A | 9/2006 | | |
| JP | 2007-169750 A | 7/2007 | | |
| JP | 2007169750 | * 7/2007 | ............... | C21B 5/00 |
| JP | 5070706 | * 11/2012 | ............... | C21B 5/00 |
| JP | 5070706 B2 | 11/2012 | | |
| JP | 6019893 | * 11/2016 | ............... | C21B 5/00 |
| JP | 6019893 B2 | 11/2016 | | |

\* cited by examiner

BLAST FURNACE OPERATION METHOD

TECHNICAL FIELD OF THE INVENTION

The present invention relates to a blast furnace operation method.

Priority is claimed on Japanese Patent Application No. 2019-026220, filed on Feb. 18, 2019, the content of which is incorporated herein by reference.

RELATED ART

In the steel industry, a blast furnace method is the mainstream of a steelmaking process. In the blast furnace method, iron-bearing materials for a blast furnace (raw materials including iron oxide; mainly sintered ores; hereinafter simply referred to as "iron-bearing materials") and coke are alternately charged in layers into a blast furnace from the top of the blast furnace, and hot blast is blown into the blast furnace from a tuyere of a blast furnace lower part. The hot blast reacts with pulverized coal blown together with the hot blast and the coke in the blast furnace such that high-temperature reducing gas (here, mainly CO gas) is produced in the blast furnace. That is, the hot blast gasifies the coke and the pulverized coal in the blast furnace. The reducing gas rises in the blast furnace and reduces the iron-bearing material while heating the iron-bearing materials. The iron-bearing materials are heated and reduced by the reducing gas while falling in the blast furnace. Next, the iron-bearing materials are melted and are dropped into the blast furnace while being further reduced by the coke. Finally, the iron-bearing materials are accumulated in a hearth as molten iron (pig iron) including about 5 mass % of carbon. The molten iron in the hearth is extracted from a tap hole and is provided for the next steelmaking process. Accordingly, in the blast furnace method, a carbon material such as coke or pulverized coal is used as a reducing material.

Incidentally, recently, global warming has been a social problem, and reduction in emissions of carbon dioxide ($CO_2$ gas) that is one greenhouse effect gas has been claimed as a countermeasure against global warming. As described above, in the blast furnace method, a large amount of pig iron is manufactured using a carbon material as a reducing material. Therefore, a large amount of $CO_2$ is produced. Accordingly, the steel industry is a main industry regarding $CO_2$ gas emissions and need to meet the demand of society. Specifically, further reduction in the reducing material ratio (the amount of reducing material used per ton of molten iron is urgently required in the blast furnace operation. Specifically, the reducing material ratio refers to the total mass of coke and pulverized coal required for producing one ton of molten iron (and when reducing gas is blown from a tuyere, reducing gas (described below blown from a tuyere).

The reducing material has a function of heating materials to be charged into the furnace as a heat source and a function of reducing the iron-bearing material in the furnace, and needs to increase the reduction efficiency in the furnace for reducing the reducing material ratio. Reduction reactions in the furnace can be represented by various reaction formulae. Among these reduction reactions, a direct reduction reaction (reaction formula: $FeO+C \rightarrow Fe+Co$) by coke is an endothermic reaction accompanied by high absorption of heat. Accordingly, in order to reduce the reducing material ratio, it is important to suppress the occurrence of the direct reduction reaction as far as possible. The reason for this is that, by suppressing the occurrence of the direct reduction reaction as far as possible, the amount of coke and a reducing material used as a heat source required for the direct reduction reaction can be reduced. The direct reduction reaction occurs in a blast furnace lower part. Therefore, as long as the iron-bearing materials can be sufficiently reduced by reducing gas such as CO or $H_2$ until the iron-bearing materials reach the furnace lower part, the iron-bearing materials as a target of the direct reduction reaction can be reduced.

As techniques in the related art for solving the above-described problem, for example, as disclosed in Patent Documents 1 to 3, a technique of improving the reducing gas potential in a furnace by blowing reducing gas (for example, COG, LPG, or methane gas) including carbon together with hot blast from a tuyere is known. In this technique, carbon in the reducing gas blown from a tuyere is converted into CO gas in the blast furnace to reduce the iron-bearing materials. As a result, the amount of the iron-bearing materials as a target of the direct reduction reaction can be reduced. In the following description, unless specified otherwise, "carbon" and "hydrogen" represent "carbon atom" and "hydrogen atom", respectively.

PRIOR ART DOCUMENT

Patent Document

[Patent Document 1] Japanese Patent No. 6019893
[Patent Document 2] Japanese Patent No. 5070706
[Patent Document 3] Japanese Unexamined Patent Application, First Publication No. 2007-169750

DISCLOSURE OF THE INVENTION

Problems to be Solved by the Invention

However, when the amount of reducing gas including carbon blown (the amount thereof blown per ton of molten iron) increases, the amount of carbon fed into the blast furnace increases together with an increase in the amount of the reducing material blown. Together with an increase in the reducing gas volume, the CO gas utilization factor in the blast furnace changes. When the reducing gas volume increases excessively, most of the reducing gas is exhausted without being used in the furnace. Accordingly, only when the amount of reducing gas blow increases, carbon in the reducing gas is exhausted without being used for reduction such that the reducing material ratio may increases or $CO_2$ emissions may increase.

Thus, the present invention has been made in consideration of the above-described problems, and object of the present invention is to provide a novel and improved blast furnace operation method in which a desired a reducing material ratio reduction effect can be obtained.

Means for Solving the Problem

In order to achieve the object, the present inventors defined a parameter reduction Input$\Delta$C in specific carbon consumption caused by blowing reducing gas into the blast furnace. Here, the specific carbon consumption Input C (kg/t-pig) refers to the amount of carbon consumed per ton of molten iron and more specifically refers to the total mass of coke, pulverized coal, and carbon in the reducing gas blown from the tuyere required for producing one ton of molten iron. Specifically, Input C is calculated from the following Numerical Expression (1).

Input $C$ (kg/t-pig)=Coke Ratio (kg/t-pig)×Carbon
Proportion (mass %) in Coke+Pulverized Coal
Ratio (kg/t-pig)×Carbon Proportion (mass %) in
Pulverized Coal+Consumption of Reducing Gas
Used (Nm³/t-pig)×Carbon Proportion (kg/Nm³)
in Reducing Gas (1)

Here, the coke ratio and the pulverized coal ratio refer to the amounts of coke and pulverized coal used per ton of molten iron. The consumption of reducing gas used refers to the reducing gas volume per ton of molten iron. The carbon proportion in coke refers to mass % of carbon with respect to the total mass of the coke, and the carbon proportion in pulverized coal refers to mass % of carbon with respect to the total mass of the pulverized coal. The carbon proportion in reducing gas refers to the carbon content per unit volume of the reducing gas. In Numerical Expression (1), the volume (Nm³/t-pig) of the reducing gas blown to manufacture one ton of molten iron was used as the consumption of reducing gas used, and the carbon content (kg/Nm³) per unit volume of reducing gas was used as the carbon proportion in the reducing gas. However, the mass (kg/t-pig) of the reducing gas blown to manufacture one ton of molten iron was used as the consumption of reducing gas used, and mass % of carbon with respect to the total mass of the reducing gas was used as the carbon proportion in the reducing gas.

Input$\Delta$C can be defined, for example, as the proportion of reduction (percentage, %) in specific carbon consumption (Input C) of an operation where a predetermined amount of reducing gas is blown with respect to a base operation. In the base operation, for example, operation conditions where the reducing gas is not blown can be set. When Input C of a base operation is represented by A (kg/t-pig) and Input C of an operation where a predetermined amount of reducing gas is blown is represented by B (kg/t-pig), Input$\Delta$C is represented by the following Numerical Expression (2). Of course, the reduction Input$\Delta$C in specific carbon consumption is not limited to a value represented by the following Numerical Expression (2) and may be a value representing the degree of reduction in specific carbon consumption with respect to the base operation. For example, Input$\Delta$C may be the difference (A−B) between A and B.

Input$\Delta C=(A-B)/A\times 100(\%)$ (2)

Input$\Delta$C is the parameter corresponding to the reducing material ratio, and as Input$\Delta$C increases, the reduction in reducing material ratio with respect to the base operation increases. As described below in Examples in detail, the present inventors calculated Input$\Delta$C with respect to the amounts of a plurality of reducing gas blown by performing a blast furnace operation simulation while changing the type of the reducing gas and the amount of the reducing gas blown (the amount of the reducing gas blown per tone of molten iron). As a result, as long as the amount of the reducing gas blown is small, Input$\Delta$C increases together with an increase in the amount of the reducing gas blown. However, it was clarified that, as the amount of the reducing gas blown further increases, the increase in Input$\Delta$C decreases, and Input$\Delta$C starts to decrease.

Figure 2:
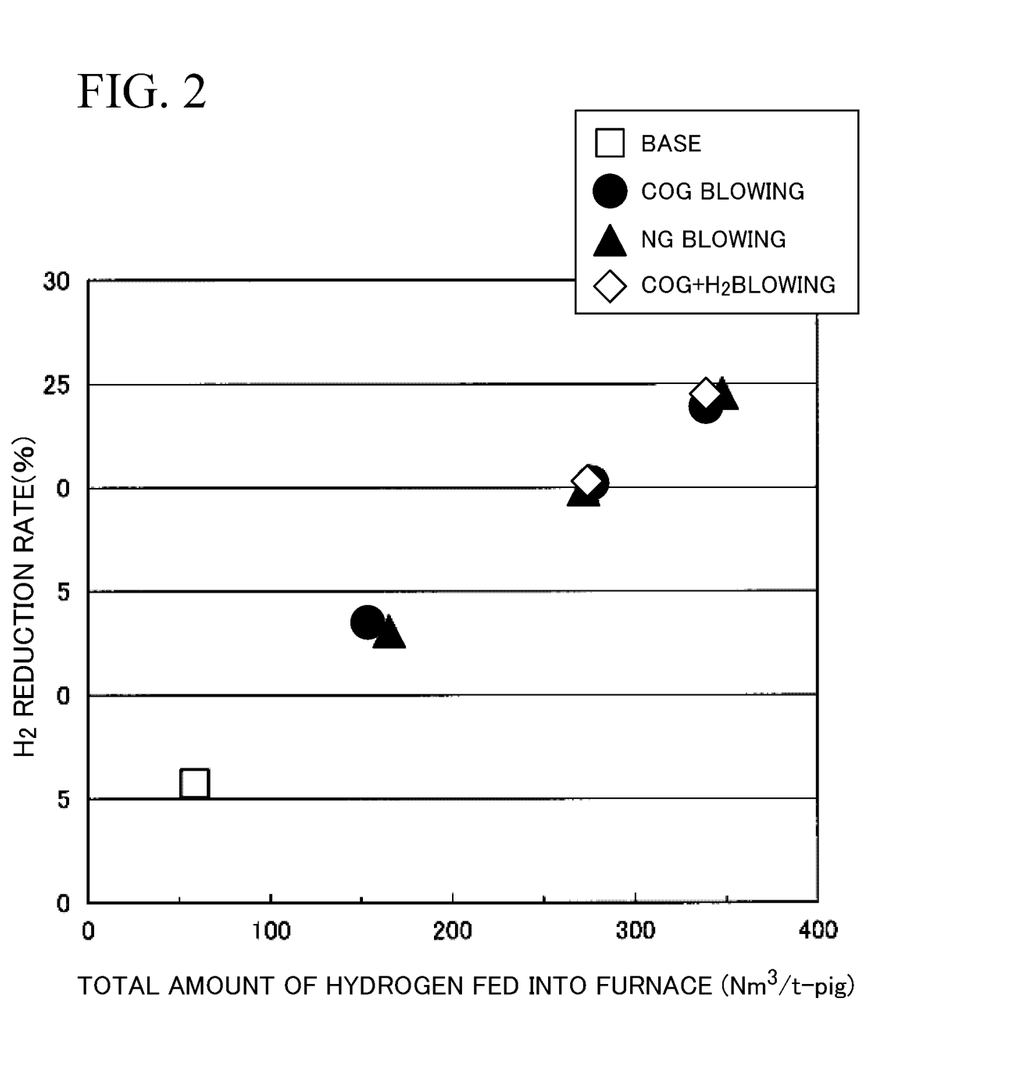
FIG. 2 is a graph showing a relationship between a hydrogen reduction rate and the amount of hydrogen fed ($Nm^3$/t-pig) into a blast furnace per ton of molten iron.
Figure 3:
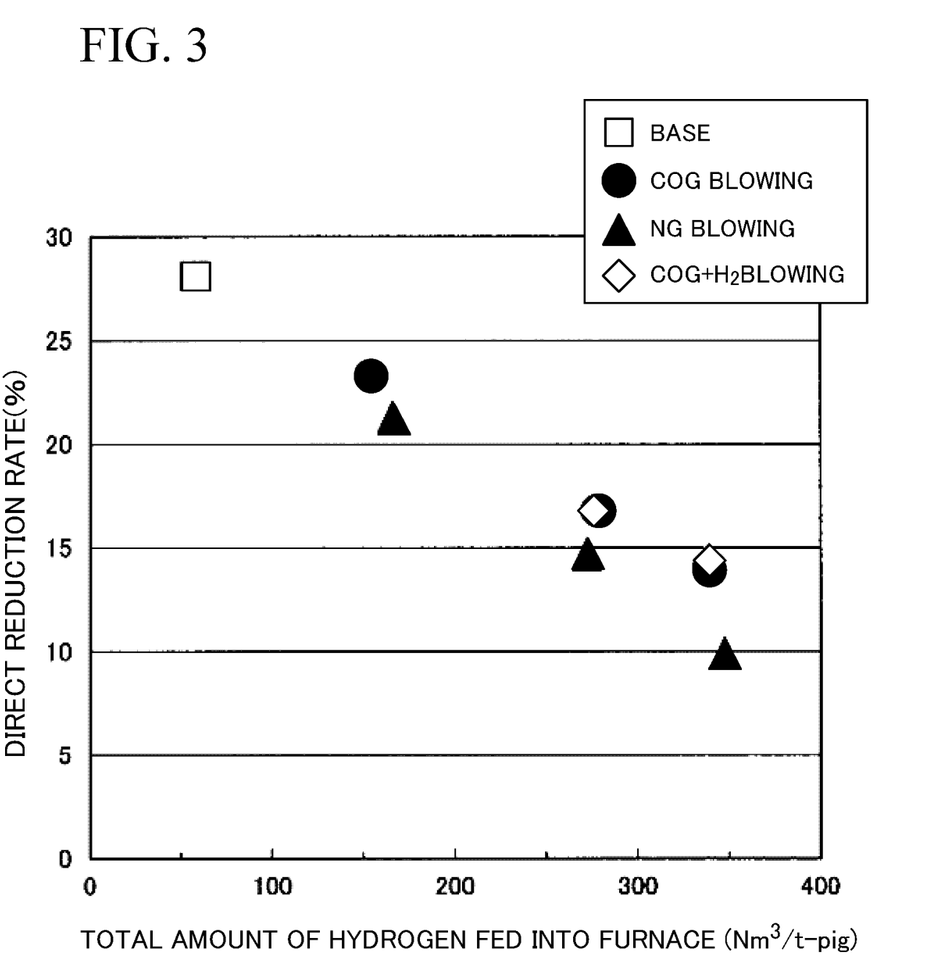
FIG. 3 is a graph showing a relationship between a direct reduction rate and the amount of hydrogen fed ($Nm^3$/t-pig) into a blast furnace per ton of molten iron.

Thus, the present inventors conducted an investigation on parameters that affect Input$\Delta$C or the reducing material ratio. First, the present inventors focused on the amount of hydrogen fed (Nm³/t-pig) into the blast furnace per ton of molten iron. The hydrogen described herein refers to hydrogen fed into the front of the tuyere and includes not only hydrogen in the reducing gas but also hydrogen in hygroscopic moisture of air and hydrogen in pulverized coal. The present inventors changed the amount of hydrogen fed by changing the type of the reducing gas and the amount of the reducing gas blown and acquires a correlation between the amount of hydrogen fed and a hydrogen reduction rate (%) at this time through the blast furnace operation simulation. Here, the blast furnace operation simulation was performed using the same method as that of Example 1 below. The hydrogen reduction rate is defined as the proportion of iron oxide reduced by hydrogen in iron oxide fed into the furnace, and the sum of a CO reduction rate (the proportion of iron oxide reduced by CO gas) and a direct reduction rate (the proportion of iron oxide reduced by direct reduction with C) is 100%. The results are shown in FIG. 2. In FIG. 2, coke oven gas (COG), natural gas (NG), and mixed gas of coke oven gas and hydrogen gas were used as the reducing gas. Here, during the mixing of coke oven gas and hydrogen gas for the mixed gas, COG:$H_2$=1:1.43 when the total amount of hydrogen fed into the furnace≈270 Nm³/t-pig, and COG:$H_2$=1:2.28 when the total amount of hydrogen fed into the furnace≈340 Nm³/t-pig. In the base operation, the reducing gas was not blown. As a result, it can be seen that, irrespective of the type of the reducing gas, as the amount of hydrogen fed increases, the hydrogen reduction rate (%) increases substantially monotonically. When the iron-bearing materials are completely reduced, the sum of the hydrogen reduction rate, the CO reduction rate, and the direct reduction rate is 100%, and there is a relation where, as the hydrogen reduction rate increases, the direct reduction rate (or the CO reduction rate) decreases. FIG. 3 shows the direct reduction rate at this time. In this test, as the amount of hydrogen fed increases, the hydrogen reduction rate increases monotonically, the direct reduction rate decreases monotonically, and Input$\Delta$C increases monotonically together with an increase in the amount of hydrogen fed. Therefore, a specific behavior that the increase in Input$\Delta$C decrease together with an increase in the amount of hydrogen fed and Input$\Delta$C starts to decrease is not likely to occur. Accordingly, it was found that the amount of hydrogen fed is not a parameter that affects the behavior of Input$\Delta$C or the reducing material ratio.

Next, the present inventors focused on the consumption of carbon fed into the blast furnace together with the reducing gas blown from the tuyere. Here, the consumption of carbon fed into the blast furnace together with the reducing gas is a value obtained by multiplying the carbon proportion (kg/Nm³) in the reducing gas by the reducing gas volume (Nm³/t-pig) per ton of molten iron. Hereinafter, the consumption of carbon fed into the blast furnace together with the reducing gas will also be referred to as "the carbon consumption in the reducing gas".

The present inventors calculated Input$\Delta$C by performing the blast furnace operation simulation while changing the carbon consumption in the reducing gas and the type of the reducing gas as described below in Examples in detail. As a result, the present inventors found that there is a correlation between Input$\Delta$C and the carbon consumption in the reducing gas.

The present inventors conducted an investigation on the correlation between Input$\Delta$C and the carbon consumption in the reducing gas and clarified that the correlation between Input$\Delta$C and the carbon consumption in the reducing gas tends to vary between a case where a molar ratio C/H of carbon atoms to hydrogen atoms in the reducing gas is 0.15 or higher and a case where C/H is lower than 0.15. More specifically, when C/H in the reducing gas is 0.15 or higher, the correlation between Input$\Delta$C and the carbon consumption in the reducing gas is uniquely determined irrespective of the type of the reducing gas (in other words, irrespective of C/H in the reducing gas). On the other hand, when C/H in the reducing gas is lower than 0.15, the correlation between InputΔC and the carbon consumption in the reducing gas varies depending on C/H in the reducing gas. Note that, in all the cases, the correlation between InputΔC and the carbon consumption in the reducing gas is represented by a graph forming an upwardly convex curve (that is, when the carbon consumption in the reducing gas is a given value, the maximum value is shown).

Accordingly, by acquiring the correlation between InputΔC and the carbon consumption in the reducing gas in advance per C/H in the reducing gas, the carbon consumption in the reducing gas can be determined such that InputΔC is a predetermined target value or higher based on the correlation. In addition, the amount of the reducing gas blown into the blast furnace can be adjusted based on the determined carbon consumption in the reducing gas and the carbon proportion in the reducing gas. As a result, desired InputΔC (that is, InputΔC that is the target value or higher) can be obtained. That is, the desired reducing material ratio reduction effect can be obtained, and further the reducing material ratio can be reduced more reliably. Further, according to this correlation, when the carbon consumption in the reducing gas is a given value, InputΔC shows a maximum value (the specific graph will be described below). Accordingly, when the carbon consumption in the reducing gas is determined such that InputΔC is close to the maximum value, the reducing material ratio can be more efficiently reduced. Further, by acquiring the correlation per C/H in the reducing gas, the amount of the reducing gas blown can be determined based on the correlation corresponding to C/H in the reducing gas. The present inventors completed the present invention based on the above-described findings.

The summary of the present invention is as follows.

According to one aspect of the present invention, there is provided a blast furnace operation method in which reducing gas including hydrogen atoms and carbon atoms is blown into a blast furnace, the method including: acquiring a correlation between a carbon consumption in reducing gas and a reduction InputΔC in specific carbon consumption caused by blowing the reducing gas into the blast furnace per molar ratio C/H of carbon atoms to hydrogen atoms in the reducing gas; determining a carbon consumption in the reducing gas where the reduction InputΔC in specific carbon consumption is a predetermined target value or higher on the basis of the correlation acquired per C/H; and adjusting the amount of the reducing gas blown into the blast furnace on the basis of the determined carbon consumption in the reducing gas and the carbon proportion in the reducing gas.

Here, the molar ratio C/H of the carbon atoms to the hydrogen atoms in the reducing gas may be 0.15 or higher.

In addition, the correlation may be represented by a quadratic expression of the carbon consumption in the reducing gas.

In addition, the correlation may be represented by $Y=a1X^2+b1X+c1$ (where X represents the carbon consumption in the reducing gas, Y represents the reduction InputΔC in specific carbon consumption, and all the coefficients a1, b1, and c1 represent values that do not depend on the molar ratio C/H).

In addition, the carbon consumption in the reducing gas may be determined in a range of 21 kg/t-pig to 107 kg/t-pig.

In addition, the carbon consumption in the reducing gas may be determined in a range of 21 kg/t-pig to 65 kg/t-pig.

In addition, the molar ratio C/H of the carbon atoms to the hydrogen atoms in the reducing gas may be higher than 0 and lower than 0.15.

In addition, the molar ratio C/H of the carbon atoms to the hydrogen atoms in the reducing gas may be 0.13 or lower.

In addition, the molar ratio C/H of the carbon atoms to the hydrogen atoms in the reducing gas may be 0.10 or lower.

In addition, the correlation may be represented by $Y=a2X^2+b2X+c2$ (where X represents the carbon consumption in the reducing gas, Y represents the reduction InputΔC in specific carbon consumption, and at least one of the coefficients a2, b2, and c2 represents a function including the molar ratio C/H as a variable).

In addition, when the reducing gas is blown into the blast furnace, a flame temperature may be adjusted to be 2000° C. or higher.

In addition, in order to adjust the flame temperature to be 2000° C. or higher, at least one of an blast volume or an oxygen enrichment ratio in hot blast may be adjusted.

In addition, the reducing gas may be selected from the group consisting of coke oven gas, natural gas, reformed top gas (BFG), city gas, mixed gas thereof, and hydrogen mixed gas obtained by mixing hydrogen gas therewith.

Effects of the Invention

According to the aspect of the present invention, the desired reducing material ratio reduction effect can be obtained.

EMBODIMENTS OF THE INVENTION

Hereinafter, a preferable embodiment of the present invention will be described in detail. In the following embodiment, a numerical limitation range represented using "to" refers to a range including numerical values before and after "to" as a lower limit and an upper limit. A numerical value shown together with "more than" or "less than" is not included in a numerical range.

<1. Correlation between InputΔC and Carbon Consumption in Reducing Gas>

Figure 1:
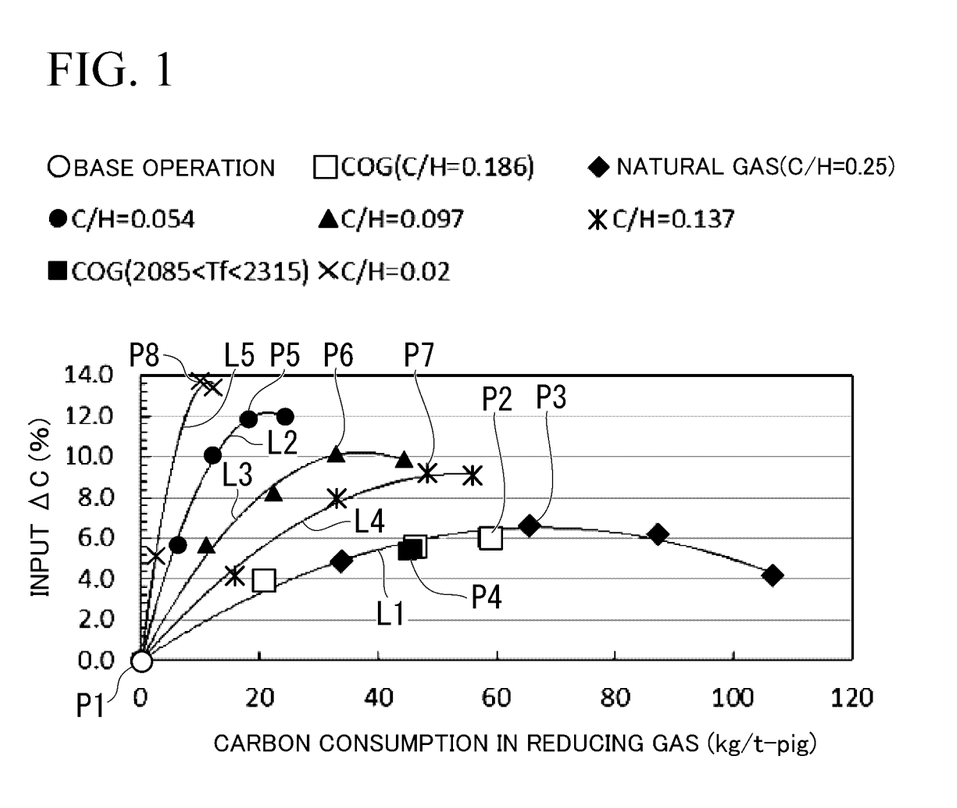
FIG. 1 is a graph showing a correlation between InputΔC and a carbon consumption (kg/t-pig) in reducing gas per C/H in the reducing gas.

First, a correlation between InputΔC and a carbon consumption in reducing gas blown from a tuyere (hereinafter, the correlation will also be referred to as "ΔC-reducing gas correlation") will be described based on FIG. 1. In FIG. 1 the vertical axis (y axis) represents InputΔC (%) and the horizontal axis (x axis) represents the carbon consumption (kg/t-pig) in the reducing gas.

Here, InputΔC can be defined as the proportion of reduction in specific carbon consumption caused by blowing the reducing gas into the blast furnace. When Input C of a base operation is represented by A (kg/t-pig) and Input C of an operation where a predetermined amount of reducing gas is blown is represented by B (kg/t-pig), InputΔC is represented by the following Numerical Expression (2). Note that InputΔC of the base operation in FIG. 1 is 0.0. Of course, InputΔC is not limited to being represented by the following Numerical Expression (2). For example, the difference (A−B) between A and B may be acquired as Input$\Delta C$.

$$\text{Input}\Delta C = (A-B)/A \times 100(\%) \quad (2)$$

The carbon consumption in the reducing gas refers to the consumption of carbon fed into the blast furnace by the reducing gas blown from the tuyere as described above, and can be obtained by multiplying the carbon proportion (kg/$Nm^3$) in the reducing gas by the reducing gas volume ($Nm^3$/t-pig) per ton of molten iron.

The reducing gas is blown into the blast furnace from a tuyere provided in the blast furnace. The reducing gas includes reducing components that reduce iron-bearing materials in the blast furnace. Here, the reducing components according to the embodiment include not only a component (for example CO gas or hydrogen gas) that can reduce the iron-bearing materials by itself but also a component (for example, $CO_2$ gas or hydrocarbon gas) that can produce reducing gas through a reaction in the blast furnace (for example, a reaction with coke, pulverized coal, or the like or decomposition).

The $\Delta C$-reducing gas correlation shown in FIG. 1 is acquired by performing, for example, a blast furnace operation simulation. As the blast furnace operation simulation, for example, a so-called "Blast Furnace Mathematical Model" Kouji TAKATANI, Takanobu INADA, Yutaka UJI-SAWA, "Three-dimensional Dynamic Simulator for Blast Furnace", ISU International, Vol. 39 (1999), No. 1, p. 15 to 22 can be used. In this blast furnace mathematical model, an internal region of the blast furnace is divided in a height direction, a radial direction, and a circumferential direction to define a plurality of meshes (small regions), and the behavior of each of the meshes is simulated. The summary of the blast furnace operation simulation is as follows. That is, the blast furnace operation simulation is performed using various cases where C/H in the reducing gas and the amount of the reducing gas blown (the amount thereof blown per ton of molten iron) are different from each other. The cases also include the base operation (a case where the reducing gas volume is 0). Here, operation conditions are adjusted such that the flame temperature and the molten iron temperature are as constant as possible in the cases. For example, at least one of an blast volume or an oxygen enrichment ratio in hot blast may be adjusted. Here, the flame temperature refers an in-furnace temperature in a tip end portion of the tuyere on the inside of the furnace, and will also be referred to as "tuyere tip temperature". In the actual operation, the flame temperature is calculated as a tuyere tip theoretical combustion temperature according to Lamm equation described in "Ironmaking Handbook" (Chijinshokan Co., Ltd.), Akitoshi SHIGEMI. The hot blast blown into the blast furnace is gas including air. The hot blast may include hygroscopic moisture and enriched oxygen in addition to air. Schematically, the oxygen enrichment ratio refers to the volume proportion of oxygen in the hot blast with respect to the total volume of the hot blast, and is represented by "Oxygen enrichment ratio (%)={(Blast volume [$Nm^3$/min]×0.21+Amount of Enriched Oxygen [$Nm^3$/min]/(Blast volume [$Nm^3$/min]+Amount of Enriched Oxygen [$Nm^3$/min])}×100−21. In addition to or instead of the adjustment of the above-described factors, at least one of a coke ratio or a pulverized coal ratio may be adjusted. As a result, Input$\Delta C$ and the carbon consumption in the reducing gas are acquired per case. Incidentally, a point representing Input$\Delta C$ and the carbon consumption in the reducing gas of each of the cases is plotted on the xy plane shown in FIG. 1. Points P1 to P8 are examples of the plotted points. A fitted curve of each of the plots is acquired using an approximation method such as a least-squares method or the like. These fitted curves form a graph showing the $\Delta C$-reducing gas correlation. Graphs L1 to L5 are examples of the graph showing the $\Delta C$-reducing gas correlation.

(1-1. Case where C/H is 0.15 or Higher)

As described above, the correlation between Input$\Delta C$ and the carbon consumption in the reducing gas, that is, the $\Delta C$-reducing gas correlation tends to vary between a case where a molar ratio C/H of carbon atoms to hydrogen atoms in the reducing gas is 0.15 or higher and a case where C/H is lower than 0.15. Therefore, first, the $\Delta C$-reducing gas correlation of the case where C/H is 0.15 or higher will be described based on the points P1 to P4 and the graph L1.

Here, the point P1 represents Input$\Delta C$ and the carbon consumption in the reducing gas in the base operation (operation where the reducing gas is not blown), the points P2 and P4 represent Input$\Delta C$ and the carbon consumption in the reducing gas in an operation where coke oven gas (COG, C/H=0.186) as the reducing gas is blown, and the point P3 represents Input$\Delta C$ and the carbon consumption in the reducing gas in an operation where natural gas (C/H=0.25) as the reducing gas is blown. The points P1 to P3 were acquired using the same method as that of Example 1 described below. The point P4 was acquired using the same method as that of Example 1, except that the flame temperature was set as 2085° C. or 2315° C. The graph L1 is a graph showing the fitted curve of the points of P1 to P4, that is, the $\Delta C$-reducing gas correlation.

Examples of the reducing gas where C/H is 0.15 or higher include COG, natural gas, city gas, and the like. The reducing gas may be gas obtained by reforming top gas (BFG) (gas obtained by removing water vapor and $CO^2$ gas from top gas). Among these, the reducing gas including hydrocarbon gas, that is, COG, natural gas, city gas or the like is preferable. When this reducing gas is used, the hydrocarbon gas is combusted in the furnace to generate heat of combustion. Therefore, a further reduction in reducing material ratio can be expected. Further, in an iron mill where a coke furnace is present, the energy can be provided from the iron mill itself by using COG. COG is more preferable to the other reducing gases from the viewpoint of costs. The upper limit of C/H is not particularly limited and, for example, may be 0.3 or lower.

The composition of COG used to obtain data of the points P2 and P4 is shown in Table 1, and the composition of natural gas used to obtain data of the point P3 is shown in Table 2. These compositions were measured by gas chromatography, a mass spectrometer, or the like. The numerical values of each of the components shown in Table 1 and 2 are the molar ratio (more specifically, the ratio between the molar concentrations (mol/L)). Note that C represents the carbon proportion (kg/$Nm^3$) in the reducing gas. C/H of the COG having the composition shown in Table 1 below is 0.185. The calculation example is as follows.

$$(0.065+0.025+0.292+0.02\times2+0.008\times2)/(0.535\times2+0.292\times4+0.02\times4+0.008\times6)=0.185$$

In addition, C/H of the natural gas having the composition shown in Table 2 below is 0.271. The calculation example is as follows.

$$(0.85+0.03\times2+0.12\times2)/(0.85\times4+0.03\times4+0.12\times6)=0.271$$

TABLE 1

Example of COG Composition

| CO (—) | $CO_2$ (—) | $H_2$ (—) | $N_2$ (—) | $CH_4$ (—) | $C_2H_4$ (—) | $C_2H_6$ (—) | C (kg/Nm$^3$) | C/H (—) |
|---|---|---|---|---|---|---|---|---|
| 0.065 | 0.025 | 0.535 | 0.055 | 0.292 | 0.02 | 0.008 | 0.23 | 0.185 |

TABLE 2

Example of Natural Gas Composition

| $CH_4$ (—) | $C_2H_4$ (—) | $C_2H_6$ (—) | C (kg/Nm$^3$) | C/H (—) |
|---|---|---|---|---|
| 0.85 | 0.03 | 0.12 | 0.62 | 0.271 |

As can be seen from FIG. 1, the points P1 to P4 are present on substantially the same graph L1. Accordingly, by acquiring the carbon consumption in the reducing gas irrespective of the type of the reducing gas (in other words, irrespective of C/H in the reducing gas), Input$\Delta$C can be uniquely specified. That is, Input$\Delta$C and the carbon consumption in the reducing gas have a correlation that does not depend on C/H, this correlation is represented by the graph L1. Further, when the fact that the point P4 is present on the graph L1 is taken into consideration, it can be said that the correlation also does not depend on the flame temperature.

Since the graph L1 is represented by an upwardly convex graph, the carbon consumption in the reducing gas is represented by a quadratic expression. For example, the graph L1 is represented by the numerical expression $Y = a1X^2 + b1X + c1$. X represents the carbon consumption in the reducing gas, and Y represents Input$\Delta$C. All the coefficients a1, b1, and c1 represent values that do not depend on the molar ratio C/H. In the example of FIG. 1, the graph L1 is represented by the numerical expression $Y = -0.0014X^2 + 0.194X$ (that is, a1=−0.0014, b1=0.194, c1=0). Of course, the graph L1 is not limited to being represented by this numerical expression.

According to the graph L1, when the carbon consumption in the reducing gas is in a range of 65 kg/t-pig or lower, Input$\Delta$C has a positive correlation with the carbon consumption in the reducing gas, and when the carbon consumption in the reducing gas is in a range of higher than 65 kg/t-pig, Input$\Delta$C has a negative correlation with the carbon consumption in the reducing gas. In addition, when the carbon consumption in the reducing gas is about 65 kg/t-pig, Input$\Delta$C shows a maximum value. Accordingly, when the carbon consumption in the reducing gas is determined such that Input$\Delta$C is close to the maximum value, the reducing material ratio can be further reduced.

More specifically, when the carbon consumption in the reducing gas is in a range of 21 kg/t-pig to 107 kg/t-pig, Input$\Delta$C is approximately 4.0% or higher. In this case, for example, assuming that the reducing material ratio of the base operation is 375 kg/t-pig to 500 kg/t-pig, the reducing material ratio is reduced by about 15 kg/t-pig to 20 kg/t-pig or more. This reduction is a significant value in consideration of the daily fluctuation in reducing material ratio, and the effectiveness of the reduction in reducing material ratio can be expected. Accordingly, the carbon consumption in the reducing gas is preferably 21 kg/t-pig to 107 kg/t-pig.

Here, when the carbon consumption in the reducing gas is about 65 kg/t-pig, Input$\Delta$C shows a maximum value, and when the carbon consumption in the reducing gas exceeds 65 kg/t-pig, Input$\Delta$C starts to decrease. That is, the effect of reducing Input C is lost. For example, the reason for this is presumed to be that the carbon consumption in the reducing gas is excessively high compared to the amount required for in-furnace reduction such that the gas utilization factor decreases or to be that, although the amount of the reducing gas blown increases together with an increase in the carbon consumption in the reducing gas, under the condition that the flame temperature is constant, the oxygen enrichment ratio increases together with an increase in the amount of the reducing gas blown and the amount of the gas blown into the blast furnace through a hot stove decreases such that the sensible heat of air decreases, or the like. Accordingly, the carbon consumption in the reducing gas is more preferably 65 kg/t-pig or lower, that is, 21 kg/t-pig to 65 kg/t-pig. In this case, Input$\Delta$C can be made to be high (specifically 4.0% or higher) with a smaller amount of the reducing gas blown.

In addition, when the reducing gas in which the carbon proportion (kg/Nm$^3$) is low (in particular, the reducing gas in which the carbon proportion is lower than 0.6 kg/Nm$^3$) is used, due to the restrictions of the operation, there may be a case where the carbon consumption in the reducing gas is preferably 65 kg/t-pig or lower. Hereinafter, the reason for this will be described in detail.

In the blast furnace operation, it is necessary that the flame temperature is maintained at a constant value that is higher than or equal to a predetermined value (here, the predetermined value varies depending on various factors but is likely to be a value about 2000° C.) as far as possible. The reason for this is that, when the flame temperature is lower than the predetermined value, the combustibility of pulverized coal decreases and there is a problem, for example, in that unburnt chart is produced and deteriorates in-furnace permeability or in that only a part of pulverized coal fed as the reducing material can be used as the reducing gas (that is produced in the furnace), or the like. When the carbon proportion (kg/Nm$^3$) in the reducing gas blown from the tuyere is low, it is necessary to blow a large amount of the reducing gas in order to adjust the carbon consumption in the reducing gas to be higher than 65 kg/t-pig. As a result, it is necessary to increase the oxygen enrichment ratio in the hot blast. The reason for this is presumed to be that, unless the oxygen enrichment ratio is increased, there may be a case where the flame temperature cannot be maintained at the predetermined value or higher. Note that, as the oxygen enrichment ratio increases, the oxygen proportion in the hot blast increases such that pure oxygen is blown. At this time, the oxygen enrichment ratio reaches the upper limit, and the oxygen enrichment ratio cannot increase any more.

For example, when the carbon consumption in the reducing gas is adjusted to 83 kg/t-pig by using the COG having the composition shown in Table 1, it is necessary to blow the COG at 350 Nm$^3$/t-pig. In this case, by increasing the oxygen enrichment ratio to be close to the upper limit, the flame temperature can be maintained at the predetermined value or higher. However, it is necessary to design operation elements carefully such that the flame temperature is very close to the predetermined value, and it is necessary to monitor the elements carefully during the operation. Accordingly, the operation can be performed, but time and efforts are required for the operation. Further, when the carbon consumption in the reducing gas is 95 kg/t-pig, it is necessary to blow the COG at 400 Nm$^3$/t-pig. In this case, even when pure oxygen is blown, there may be a case where the flame temperature cannot be maintained at the predetermined value or higher. When the carbon consumption in the reducing gas is 65 kg/t-pig or lower, the amount of the COG blown can be made to be lower than 350 Nm$^3$/t-pig. Therefore, an allowance can be given to the oxygen enrichment ratio and the flame temperature. Accordingly, when the reducing gas in which the carbon proportion (kg/Nm$^3$) is low (in particular, the reducing gas in which the carbon proportion is lower than 0.6 kg/Nm$^3$) is used, the carbon consumption in the reducing gas is preferably 65 kg/t-pig or lower.

On the other hand, when the natural gas (the carbon proportion is 0.6 kg/Nm$^3$ or higher) shown in Table 2 is used, basically, the above-described restrictions are not present. For example, even when the carbon consumption in the reducing gas is 100 kg/t-pig which is much higher than 65 kg/t-pig, the amount of the reducing gas blow needs to be only about 170 Nm$^3$/t-pig. In this case, although a decrease in flame temperature is concerned, the flame temperature can be made to be the predetermined value or higher by increasing the oxygen enrichment ratio. Accordingly, the carbon consumption in the reducing gas can be made to be higher than 65 kg/t-pig.

Due to the above-described reasons, the point P2 is plotted in a range of 65 kg/t-pig or lower, but the point P3 is plotted in a wider range.

When operation conditions other than the above-described conditions change, the ΔC-reducing gas correlation may slightly fluctuation from the graph L1. Even in this case, however, it is considered that there is no significant fluctuation in the preferable range of the carbon consumption in the reducing gas.

(1-2. Case where C/H is Lower than 0.15)

Incidentally, first, the ΔC-reducing gas correlation of the case where C/H is lower than 0.15 will be described based on the points P1 and P5 to P8 and the graphs L2 to L5. Here, the point P5 represents InputΔC and the carbon consumption in the reducing gas in a case where C/H in the reducing gas is 0.054, the point P6 represents InputΔC and the carbon consumption in the reducing gas in a case where C/H in the reducing gas is 0.097, the point P7 represents InputΔC and the carbon consumption in the reducing gas in a case where C/H in the reducing gas is 0.137, and the point P8 represents InputΔC and the carbon consumption in the reducing gas in a case where C/H in the reducing gas is 0.02. The points P5 to P8 were acquired using the same method as that of Example 2 described below. The graphs L2 to L5 are graphs showing the fitted curves of the points of P5 to P8, that is, the ΔC-reducing gas correlations, respectively.

The present inventors conducted an investigation on the reducing gas (for example, COG, natural gas, city gas, and the like) in the related art, and C/H in most of the reducing gas was 0.15 or higher. Therefore, the reducing gas in which C/H is lower than 0.15 may be produced, for example, by mixing hydrogen gas with reducing gas in which C/H is 0.15 or higher. The reducing gas in which hydrogen gas is mixed may be any one as long as it is reducing gas in which C/H is 0.15 or higher, and examples thereof include COG, natural gas, top gas, city gas, and the like. In addition, the method of producing the reducing gas is not necessarily limited to this method. For example, the reducing gas in which C/H is lower than 0.15 may be produced by mixing reducing gases having different C/H's (specifically, reducing gas in which C/H is 0.15 or higher and reducing gas in which C/H is lower than 0.02) with each other.

As clearly seen from FIG. 1, the points P5 to P8 are present in the graphs L2 to L5 that are different from each other, respectively. Accordingly, when C/H in the reducing gas is lower than 0.15, the ΔC-reducing gas correlation varies depending on C/H in the reducing gas. That is, by acquiring C/H in the reducing gas and the carbon consumption in the reducing gas, InputΔC can be uniquely specified. This way, InputΔC and the carbon consumption in the reducing gas have a correlation that depends on C/H, and the correlation per C/H is represented by, for example, the graphs L2 to L5. Note that all the correlations are represented by the upwardly convex graphs (that is, when the carbon consumption in the reducing gas is a given value, a maximum value is shown). It is presumed that, even when the flame temperature fluctuates, there is substantially no effect on the correlation as in the case where C/H is 0.15 or higher.

Since the graphs L2 to L5 are represented by an upwardly convex graph, the graphs L2 to L5 are represented by a quadratic expression of carbon consumption in the reducing gas. For example, the graphs L2 to L5 are represented by the numerical expression Y=a2X$^2$+b2X+c2. In order to simplify the drawing, FIG. 1 does not show a curve of a portion where InputΔC starts to decrease. X represents the carbon consumption in the reducing gas, and Y represents InputΔC. Since the shapes of the graphs L2 to L5 vary depending on C/H in the reducing gas, at least one of the coefficients a2, b2, and c2 represents a function including C/H in the reducing gas as a variable. Accordingly, when the carbon consumption in the reducing gas is determined such that InputΔC is close to the maximum value, the reducing material ratio can be further reduced. As described above, the reason why the graphs L2 to L5 start to decrease from the maximum value is presumed to be that the carbon consumption in the reducing gas is excessively high compared to the amount required for in-furnace reduction such that the gas utilization factor decreases or to be that, although the amount of the reducing gas blown increases together with an increase in the carbon consumption in the reducing gas, under the condition that the flame temperature is constant, the oxygen enrichment ratio increases together with an increase in the amount of the reducing gas blown and the amount of the gas blown into the blast furnace through a hot stove decreases such that the sensible heat of air decreases, and the like.

The graphs L2 to L5 will be described in more detail. In the range of the carbon consumption in the reducing gas where InputΔC does not reach the maximum value, as C/H decreases, the slopes of the graphs L2 to L5 increase. That is, an increase in InputΔC relative to a unit increase in the carbon consumption in the reducing gas increases. Accordingly, as C/H in the reducing gas decreases, InputΔC can be efficiently increased. More specifically, C/H in the reducing gas is preferably 0.13 or lower, more preferably 0.10 or lower, and still more preferably 0.05 or lower. The lower limit of C/H is not particularly limited as long as it is higher than 0.

As described above, the correlation is present between InputΔC and the carbon consumption in the reducing gas. This correlation, that is, the ΔC-reducing gas correlation tends to vary between a case where the molar ratio C/H of carbon atoms to hydrogen atoms in the reducing gas is 0.15 or higher and a case where C/H is lower than 0.15. That is, when C/H in the reducing gas is 0.15 or higher, the ΔC-reducing gas correlation is uniquely determined irrespective of the type of the reducing gas (in other words, irrespective of C/H in the reducing gas). On the other hand, when C/H in the reducing gas is lower than 0.15, the ΔC-reducing gas correlation varies depending on C/H in the reducing gas. Note that, in all the cases, the correlation between InputΔC and the carbon consumption in the reducing gas is represented by the upwardly convex graph (that is, when the carbon consumption in the reducing gas is a given value, a maximum value is shown).

Accordingly, by acquiring the ΔC-reducing gas correlation per C/H in the reducing gas in advance, the carbon consumption in the reducing gas can be determined such that InputΔC is a predetermined target value or higher based on the correlation. In addition, the amount of the reducing gas blown into the blast furnace can be adjusted based on the determined carbon consumption in the reducing gas and the carbon proportion in the reducing gas. As a result, desired InputΔC (that is, InputΔC that is the target value or higher) can be obtained. That is, the desired reducing material ratio reduction effect can be obtained, and further the reducing material ratio can be reduced more reliably. The blast furnace operation method according to the embodiment is made based on the above-described findings.

In the above-described example, the ΔC-reducing gas correlation is acquired by performing the blast furnace operation simulation, but the method of acquiring the ΔC-reducing gas correlation is not limited thereto. Likewise, in an operation in an actual furnace (including a real operation and a test operation) or a test operation in a test blast furnace, the ΔC-reducing gas correlation can be acquired by calculating InputΔC while changing the carbon consumption in the reducing gas.

<2. Blast Furnace Operation Method>

Next, the blast furnace operation method according to the embodiment will be described. The blast furnace operation method according to the embodiment includes first to third processes described below.

(2-1. First Process)

In the first process, the ΔC-reducing gas correlation is acquired per C/H in the reducing gas. The method of acquiring the ΔC-reducing gas correlation (acquisition method) is not particularly limited. For example, the ΔC-reducing gas correlation can be acquired by performing the blast furnace operation simulation. As the blast furnace operation simulation, for example, a so-called "Blast Furnace Mathematical Model" Kouji TAKATANI, Takanobu INADA, Yutaka UJISAWA, "Three-dimensional Dynamic Simulator for Blast Furnace", ISIJ International, Vol. 39 (1999), No. 1, p. 15 to 22 can be used. In this blast furnace mathematical model, an internal region of the blast furnace is divided in a height direction, a radial direction, and a circumferential direction to define a plurality of meshes (small regions), and the behavior of each of the meshes is simulated. Calculation conditions of the blast furnace operation simulation are not particularly limited and are preferably determined depending on actual operation conditions. For example, the flame temperature is preferably 2000° C. or higher. Note that, as described above, even when the flame temperature changes, the ΔC-reducing gas correlation does not substantially fluctuate. By performing the blast furnace operation simulation, the ΔC-reducing gas correlation is acquired per C/H. That is, a graph showing the ΔC-reducing gas correlation is acquired. Here, as described above, the ΔC-reducing gas correlation tends to vary between a case where C/H in the reducing gas is 0.15 or higher and a case where C/H in the reducing gas is lower than 0.15. Therefore, it is preferable that plural types of ΔC-reducing gas correlations of various cases are obtained.

The method of acquiring the ΔC-reducing gas correlation will be described in more detail. The blast furnace operation simulation is performed using various cases where C/H in the reducing gas and the amount of the reducing gas blown are (the amount thereof blown per ton of molten iron) are different from each other. The cases also include the base operation (operation where the reducing gas volume is 0). Here, it is preferable that the calculation conditions (operation conditions) are adjusted such that the flame temperature and the molten iron temperature are as constant as possible in the cases. In order to make the flame temperature constant, at least one of an blast volume or an oxygen enrichment ratio in hot blast may be adjusted. In addition to or instead of the adjustment of the above-described factors, at least one of the coke ratio and the pulverized coal ratio may be adjusted. As a result, InputΔC and the carbon consumption in the reducing gas are acquired per case. Incidentally, a point representing InputΔC and the carbon consumption in the reducing gas of each of the cases is plotted on, for example, the xy plane shown in FIG. 1. Points P1 to P8 are examples of the plotted points. Next, a fitted curve of each of the plots is acquired using an approximation method such as a least-squares method. These fitted curves form a graph showing the ΔC-reducing gas correlation. The graphs L1 to L5 are examples of the graph showing the ΔC-reducing gas correlation.

(2-2. Second Process)

In the second process, the carbon consumption in the reducing gas where InputΔC is a predetermined target value or higher is determined based on the ΔC-reducing gas correlation acquired in the first process. That is, the ΔC-reducing gas correlation corresponding to C/H in reducing gas to be actually used is selected, and the carbon consumption in the reducing gas where InputΔC is a predetermined target value or higher is determined based on the selected ΔC-reducing gas correlation. C/H in the reducing gas may be acquired, for example, by specifying the composition of the reducing gas using the above-described measurement method and acquiring C/H based on the specified composition of the reducing gas.

Here, as described above, the ΔC-reducing gas correlation is represented by the upwardly convex graph. Accordingly, it is preferable that the carbon consumption in the reducing gas is determined such that InputΔC is close to the maximum value. As a result, the reducing material ratio can be further reduced. For example, when C/H in the reducing gas to be actually used is 0.15 or higher, it is preferable that the carbon consumption in the reducing gas is determined in a range of 21 kg/t-pig to 107 kg/t-pig, and it is more preferable that the carbon consumption in the reducing gas is determined in a range of 21 kg/t-pig to 65 kg/t-pig. The reason for this is as described above. That is, by determining the carbon consumption in the reducing gas in the range of 21 kg/t-pig to 107 kg/t-pig, InputΔC can be made to be 4.0% or higher. Further, by determining the carbon consumption in the reducing gas in the range of 21 kg/t-pig to 65 kg/t-pig, InputΔC can be made to be high (specifically 4.0% or higher) with a smaller amount of the reducing gas blown. Further, even when the carbon proportion in the reducing gas is low (in particular, when the carbon proportion is lower than 0.6 kg/Nm$^3$), the flame temperature can be stably maintained at the predetermined value or higher while increasing InputΔC.

When the reducing gas in which C/H is 0.15 or higher is used and the carbon consumption in the reducing gas is higher than 65 kg/t-pig, As described above, the flame temperature tends to decrease. Therefore, it is preferable that operation elements including the oxygen enrichment ratio are adjusted such that the flame temperature is a predetermined value (for example, 2000° C.) or higher. In addition, in the set value range, InputΔC decreases. Therefore, the carbon consumption in the reducing gas is excessively high compared to the amount required for in-furnace reduction such that the gas utilization factor decreases. Therefore, a countermeasure for improving the gas utilization factor may be taken. For example, the iron-bearing material may be changed to materials having excellent reducibility.

(2-3. Third Process)

In the third process, the amount of the reducing gas blown into the blast furnace (for example, the amount of the reducing gas blown per ton of molten iron) is adjusted based on the carbon consumption in the reducing gas determined in the second process and the carbon proportion in the reducing gas. For example, the amount of the reducing gas blow can be obtained by dividing the carbon consumption in the reducing gas by the carbon proportion in the reducing gas. By blowing the reducing gas into the blast furnace in the determined amount thereof blown, the desired reducing material ratio reduction effect can be obtained. The operation conditions other than the above-described conditions may be the same as those in the related art.

Schematically, while alternately charging the iron-bearing materials and coke in layers into the blast furnace from the top of the blast furnace, the reducing gas is blown into the blast furnace together with the hot blast from the tuyere provided in the blast furnace. The types of the iron-bearing materials and the coke are not particularly limited, and iron-bearing materials and coke that are used in the blast furnace operation in the related art can also be suitably used in the embodiment. The amount of the reducing gas blown is set to the value determined in the third process. The reducing gas may be, for example, one or more selected from the group consisting of COG, natural gas, reformed top gas (BFG), and city gas. The reducing gas may be mixed gas of the gases or hydrogen mixed gas obtained by mixing hydrogen gas with the gases (including the mixed gas). In particular, the reducing gas in which C/H is lower than 0.15 may be produced by mixing hydrogen gas with COG or the like.

The reducing gas may be blown into the blast furnace without being heated but is preferably blown into the blast furnace after being heated. By blowing the reducing gas into the blast furnace after being heated, further reduction in reducing material ratio can be expected. The heating temperature is preferably about 300° C. to 350° C.

The tuyere for blowing the reducing gas into the blast furnace (hereinafter, also referred to as "tuyere for reducing gas") is provided in, for example, a bosch part. The tuyere for reducing gas may be provided in a shaft part. The tuyere for reducing gas may be provided in both of the shaft part and the bosch part. The reducing gas blown from the shaft part preferably includes a large amount of CO and/or $H_2$ and is blown while managing C/H.

As in the blast furnace operation in the related art, the hot blast is blown into the blast furnace. The temperature of the hot blast, the composition thereof, and the amount thereof blown may be the same as those of the blast furnace operation in the related art. For example, the hot blast includes air and may further include hygroscopic moisture and enriched oxygen. The hot blast is blow into the blast furnace, for example, from the tuyere provided in the bosch part. The tuyere for blowing the hot blast into the blast furnace may be common to or different from the tuyere for reducing gas.

As described above, in the embodiment, the carbon consumption in the reducing gas where Input$\Delta$C is a predetermined target value or higher is determined based on the $\Delta$C-reducing gas correlation acquired in advance, and the amount of the reducing gas blown is determined based on the determined carbon consumption in the reducing gas and the carbon proportion in the reducing gas. Accordingly, desired Input$\Delta$C can be realized relatively reliably. That is, the desired reducing material ratio reduction effect can be obtained, and further the reducing material ratio can be reduced more reliably. As a result, $CO_2$ emissions can be reduced. Further, according to the $\Delta$C-reducing gas correlation, when the carbon consumption in the reducing gas is a given value (this value varies depending on C/H), Input$\Delta$C shows a maximum value. Accordingly, when the set value of the carbon consumption in the reducing gas is determined such that Input$\Delta$C is close to the maximum value, the reducing material ratio can be further reduced. Further, by acquiring the correlation per C/H, the amount of the reducing gas blown can be determined and managed based on the correlation corresponding to C/H in the reducing gas. Accordingly, operation elements required for increasing Input$\Delta$C can be appropriately set and managed.

EXAMPLES

Next, the effects of one aspect of the present invention will be described in more detail using examples. However, conditions of the examples are merely exemplary to confirm the operability and the effects of the present invention, and the present invention is not limited to these condition examples. The present invention can adopt various conditions within a range not departing from the scope of the present invention as long as the object of the present invention can be achieved under the conditions.

1. Example 1

In Example 1, by performing the blast furnace operation simulation, it was verified that, when C/H was 0.15 or higher, the $\Delta$C-reducing gas correlation was present.

In the blast furnace operation simulation, the above-described "blast furnace mathematical model" was used. Calculation conditions are shown in Table 3. The iron-bearing materials were all sintered ores. In addition, the composition of the sintered ores was T-Fe: 58.5%, FeO: 7.5%, C/S: 1.9, and $Al_2O_3$: 1.7%. In addition, regarding coke, a case where coke having a composition of C: 87.2% and Ash: 12.6% was used was assumed ("%" represents "mass %" in all the cases).

TABLE 3

| Calculation Conditions | | |
| --- | --- | --- |
| Productivity | t/d/m³ | 2.71~2.81 |
| Blast volume | Nm³/t-pig | 4~1035 |
| Oxgen enrichment ratio | % | 7.6~78.9 |
| Hygroscopic Moisture of Air | g/Nm³ | 5 |
| Flame temperature | ° C. | 2175~2225 |

In Example 1, by performing the blast furnace operation simulation while changing the type of the reducing gas (that is, the value of C/H) and the amount of the reducing gas blown (the amount of the reducing gas blown per ton of molten iron), it was verified that the $\Delta$C-reducing gas correlation was present. As the reducing gas, the COG having the composition shown in Table 1 or the natural gas having the composition shown in Table 2 was used. The reducing gas was blown into the blast furnace from the tuyere provided in the bosch part. The blast volume and the oxygen enrichment ratio in the hot blast were adjusted such that the flame temperature was as constant as possible (that is, was a value in the range shown in Table 3) when the reducing gas was blown. Note that the oxygen enrichment ratio was adjusted such that the flame temperature was 2085° C. in Case 8 and the oxygen enrichment ratio was adjusted such that the flame temperature was 2315° C. in Case 9. Further, in all the cases, the coke ratio was adjusted such that the molten iron temperature was constant. As fixed conditions, the pulverized coal ratio was 115 kg/t-pig, and the blast temperature was 1000° C. The calculation results are shown in Table 4 and FIG. 1.

TABLE 4

Calculation Results

| | Type of Reducing Gas — | Reducing gas volume $Nm^3$/t-pig | Carbon Consumption in Reducing Gas kg/t-pig | Input$\Delta$C % |
|---|---|---|---|---|
| Case 0 | None | 0 | 0 | 0.0 |
| Case 1 | COG | 88 | 21 | 4.0 |
| Case 2 | COG | 191 | 46 | 5.6 |
| Case 3 | COG | 244 | 59 | 6.1 |
| Case 4 | Natural Gas | 55 | 34 | 4.9 |
| Case 5 | Natural Gas | 106 | 65 | 6.6 |
| Case 6 | Natural Gas | 141 | 87 | 6.2 |
| Case 7 | Natural Gas | 173 | 107 | 4.2 |
| Case 8 | COG | 195 | 46 | 5.6 |
| Case 9 | COG | 193 | 45 | 5.4 |

As shown in Table 4 and FIG. 1, it was able to be verified that the $\Delta$C-reducing gas correlation was present. Further, it was also verified that, when C/H in the reducing gas was 0.15 or higher, the $\Delta$C-reducing gas correlation was uniquely determined irrespective of the type of the reducing gas (in other words, irrespective of C/H in the reducing gas). By determining the carbon consumption in the reducing gas where Input$\Delta$C is a predetermined target value or higher using the $\Delta$C-reducing gas correlation and determining the amount of the reducing gas blown based on the determined carbon consumption in the reducing gas, the reducing material ratio can be reduced more reliably, and further $CO_2$ emissions can be reduced.

2. Example 2

In Example 2, by performing the blast furnace operation simulation, it was verified that, when C/H was lower than 0.15, the $\Delta$C-reducing gas correlation was present.

In the blast furnace operation simulation, the above-described "blast furnace mathematical model" was used. Calculation conditions were the same as those of Example 1. In addition, it was assumed that the same iron-bearing materials and the same coke as those of Example 1 were used.

In Example 2, by performing the blast furnace operation simulation while changing C/H in the reducing gas and the amount of the reducing gas blown (the amount of the reducing gas blown per ton of molten iron), it was verified that the $\Delta$C-reducing gas correlation was present. In the actual operation, C/H in the reducing gas can be adjusted, for example, by mixing the COG having the composition shown in Table 1 with hydrogen gas at a different mixing ratio per case. The reducing gas was blown into the blast furnace from the tuyere provided in the bosch part. The blast volume and the oxygen enrichment ratio in the hot blast were adjusted such that the flame temperature was as constant as possible (that is, was a value in the range shown in Table 3) when the reducing gas was blown. Further, in all the cases, the coke ratio was adjusted such that the molten iron temperature was constant. As fixed conditions, the pulverized coal ratio was 115 kg/t-pig, and the blast temperature was 1000° C. The calculation results are shown in Table 5 and FIG. 1.

TABLE 5

Calculation Results

| | C/H in Reducing Gas — | Reducing gas volume $Nm^3$/t-pig | Carbon Consumption in Reducing Gas kg/t-pig | Input$\Delta$C % |
|---|---|---|---|---|
| Case 0 | — | 0 | 0 | 0.0 |
| Case 1 | 0.054 | 99 | 6.1 | 5.7 |
| Case 2 | 0.054 | 199 | 12.1 | 10.0 |
| Case 3 | 0.054 | 294 | 17.9 | 11.8 |
| Case 4 | 0.054 | 396 | 24.1 | 11.9 |
| Case 5 | 0.097 | 99 | 11.1 | 5.6 |
| Case 6 | 0.097 | 199 | 22.5 | 8.3 |
| Case 7 | 0.097 | 292 | 33.0 | 10.2 |
| Case 8 | 0.097 | 393 | 44.4 | 9.9 |
| Case 9 | 0.137 | 98 | 16.1 | 4.2 |
| Case 10 | 0.137 | 199 | 32.9 | 8.0 |
| Case 11 | 0.137 | 293 | 48.4 | 9.2 |
| Case 12 | 0.137 | 340 | 56.1 | 9.0 |
| Case 13 | 0.02 | 99 | 2.6 | 5.1 |
| Case 14 | 0.02 | 390 | 10.2 | 13.7 |
| Case 15 | 0.02 | 473 | 12.3 | 13.4 |

As shown in Table 5 and FIG. 1, it was able to be verified that the $\Delta$C-reducing gas correlation was present. Further, it was also verified that, when C/H in the reducing gas was lower than 0.15, the $\Delta$C-reducing gas correlation varied depending on C/H in the reducing gas. Accordingly, the correlation corresponding to C/H in the reducing gas is selected, and the carbon consumption in the reducing gas where Input$\Delta$C is a predetermined target value or higher is determined using the selected correlation. By determining the amount of the reducing gas blown based on the determined carbon consumption in the reducing gas, the reducing material ratio can be reduced more reliably, and further $CO_2$ emissions can be reduced.

What is claimed is:

1. A blast furnace operation method in which reducing gas including hydrogen atoms and carbon atoms is blown into a blast furnace, the method comprising:
    acquiring a correlation between a carbon consumption in the reducing gas and a reduction Input$\Delta$C by performing calculation using instances where molar ratio C/H in the reducing gas and an amount of the reducing gas blown are different from each other,
    wherein the Input$\Delta$C is defined as a proportion of reduction in specific carbon consumption Input C of an operation where a predetermined amount of reducing gas is blown with respect to a base operation where the reducing gas is not blown, and the Input C refers to the total mass of coke, pulverized coal, and carbon in the reducing gas for producing one ton of molten iron;
    determining a carbon consumption in the reducing gas where the reduction Input$\Delta$C in specific carbon consumption is a predetermined target value of the reduction Input$\Delta$C or higher on the basis of the correlation between the carbon consumption in the reducing gas and the reduction Input$\Delta$C acquired per the molar ratio C/H; and
    adjusting an amount of the reducing gas blown into the blast furnace on the basis of the determined carbon consumption in the reducing gas and a carbon proportion in the reducing gas, wherein the carbon consumption in the reducing gas is a value obtained by multiplying a carbon proportion kg/Nm$_3$ in the reducing gas by the reducing gas volume Nm$_3$/t-pig per ton of molten iron.

2. The blast furnace operation method according to claim 1, wherein the molar ratio C/H of the carbon atoms to the hydrogen atoms in the reducing gas is 0.15 or higher.

3. The blast furnace operation method according to claim 2, wherein the correlation is represented by a quadratic expression of the carbon consumption in the reducing gas.

4. The blast furnace operation method according to claim 3, wherein the correlation is represented by $Y=a1X^2+b1X+c1$, (where X represents the carbon consumption in the reducing gas, Y represents the reduction Input$\Delta$C in specific carbon consumption, and all the coefficients a1, b1, and c1 represent values that do not depend on the molar ratio C/H.

5. The blast furnace operation method according to claim 4, wherein the carbon consumption in the reducing gas is determined in a range of 21 kg/t-pig to 107 kg/t-pig.

6. The blast furnace operation method according to claim 4, wherein the carbon consumption in the reducing gas is determined in a range of 21 kg/t-pig to 65 kg/t-pig.

7. The blast furnace operation method according to claim 1, wherein the molar ratio C/H of the carbon atoms to the hydrogen atoms in the reducing gas is higher than 0 and lower than 0.15.

8. The blast furnace operation method according to claim 7, wherein the molar ratio C/H of the carbon atoms to the hydrogen atoms in the reducing gas is 0.13 or lower.

9. The blast furnace operation method according to claim 7, wherein the molar ratio C/H of the carbon atoms to the hydrogen atoms in the reducing gas is 0.10 or lower.

10. The blast furnace operation method according to claim 7, wherein the correlation is represented by $Y=a2X^2+b2X+c2$, (where X represents the carbon consumption in the reducing gas, Y represents the reduction Input$\Delta$C in specific carbon consumption, and at least one of the coefficients a2, b2, and c2 represents a function including the molar ratio C/H as a variable.

11. The blast furnace operation method according to claim 1, wherein when the reducing gas is blown into the blast furnace, a flame temperature is adjusted to be 2000° C. or higher.

12. The blast furnace operation method according to claim 11, wherein in order to adjust the flame temperature to be 2000° C. or higher, at least one of an blast volume or an oxygen enrichment in hot blast is adjusted.

13. The blast furnace operation method according to claim 1, wherein the reducing gas is coke oven gas, natural gas, reformed top gas gas, city gas, mixed gas thereof, or hydrogen mixed gas obtained by mixing hydrogen gas therewith.

* * * * *